US010122688B2

(12) United States Patent
Persson et al.

(10) Patent No.: US 10,122,688 B2
(45) Date of Patent: Nov. 6, 2018

(54) COMMUNICATION SYSTEM

(71) Applicant: HMS INDUSTRIAL NETWORKS AB, Halmstad (SE)

(72) Inventors: Vilhelm Persson, Åled (SE); Lars-Åke Ekstrand, Halmstad (SE); Jonas Åkerlund, Halmstad (SE); Lars Dunemark, Falkenberg (SE); Jens Jakobsen, Halmstad (SE)

(73) Assignee: HMS INDUSTRIAL NETWORKS AB (SE)

( * ) Notice: Subject to any disclaimer, the term of this patent is extended or adjusted under 35 U.S.C. 154(b) by 6 days.

(21) Appl. No.: 15/039,671

(22) PCT Filed: Nov. 25, 2014

(86) PCT No.: PCT/EP2014/075483
§ 371 (c)(1),
(2) Date: May 26, 2016

(87) PCT Pub. No.: WO2015/078844
PCT Pub. Date: Jun. 4, 2015

(65) Prior Publication Data
US 2017/0302624 A1    Oct. 19, 2017

(30) Foreign Application Priority Data
Nov. 26, 2013   (SE) ...................................... 1351402

(51) Int. Cl.
*H04L 29/06*   (2006.01)
*H04L 12/46*   (2006.01)
*H04L 12/66*   (2006.01)

(52) U.S. Cl.
CPC ........ *H04L 63/029* (2013.01); *H04L 12/4633* (2013.01); *H04L 12/66* (2013.01);
(Continued)

(58) Field of Classification Search
CPC ............... H04L 63/029; H04L 63/0272; H04L 12/4633; H04L 12/66
See application file for complete search history.

(56) References Cited

U.S. PATENT DOCUMENTS 7,685,292 B1 * 3/2010 Kinsella .............. H04L 12/4633
709/223
2002/0099937 A1 * 7/2002 Tuomenoksa ...... H04L 12/4641
713/153

(Continued)

FOREIGN PATENT DOCUMENTS

EP          1 682 952       7/2006
WO    WO2005047991 A2      5/2005

*Primary Examiner* — Morshed Mehedi
(74) *Attorney, Agent, or Firm* — Condo Roccia Koptiw LLP (57) ABSTRACT

This invention relates to a method in a communication system comprising a gateway and a server. The method comprises: sending a request for establishment of a communication tunnel from the gateway to the server; transmitting a secret from the server to the gateway in response to receiving the request in the server; establishing a communication tunnel by connecting a tunnel client in the gateway to a tunnel server in the server using the received secret; receiving data from a device connected to the gateway and transmitting at least a portion of the data to the tunnel server via the communication tunnel.

15 Claims, 5 Drawing Sheets

(52) U.S. Cl.
CPC ........ *H04L 63/0272* (2013.01); *H04L 63/107* (2013.01); *H04L 63/0471* (2013.01); *H04L 63/06* (2013.01)

(56) References Cited

U.S. PATENT DOCUMENTS

| | | | |
|---|---|---|---|
| 2002/0136226 A1* | 9/2002 | Christoffel | H04W 12/02 370/401 |
| 2008/0178266 A1* | 7/2008 | Touray | H04L 63/0884 726/4 |
| 2010/0218248 A1 | 8/2010 | Nice et al. | |
| 2011/0296186 A1 | 12/2011 | Wong et al. | |

* cited by examiner

COMMUNICATION SYSTEM

CROSS REFERENCE TO RELATED APPLICATIONS

This application is the National Stage Entry under 35 U.S.C. § 371 of Patent Cooperation Treaty Application No. PCT/EP2014/075483, filed Nov. 25, 2014 which claims the benefit of Sweden Patent Application No. 1351402-1, filed Nov. 26, 2013, the contents of which are hereby incorporated by reference in their entirety.

TECHNICAL FIELD

The present inventive concept generally relates to industrial network systems. In particular the present inventive concept relates to a communication system for remote access and remote management of electrical devices.

BACKGROUND OF THE INVENTION

Today most industrial plants include network communication between various entities in the plant for providing distributed control. The communication is normally carried out by means of a network such as a fieldbus network or an industrial Ethernet network. The fieldbus or industrial Ethernet network links controllable devices in the plant, such as motors, switches, valves etc, and data collecting devices, such as sensors, to programmable logic controllers (PLCs) which in turn are connected to a human machine interface (HMI) where an operator can monitor and control the plant.

It is common that the PLCs are arranged in a local area network at the industrial plant. The local area network may in turn be connected to a wide area network, such as the Internet. If so, the local area network is normally protected from outside attacks by a firewall. With this arrangement, in a situation where the owner of the plant has e.g. outsourced the supervision of the PLC to the manufacturer of the controller, an outside technician who seeks to connect to a PLC on the local network has the options to establish a link either directly to the PLC (e.g. by means of a RS-485 serial connection), via the local network, or via the Internet.

If a connection to the PLC is to be provided via the Internet, a communication link needs to be established through the firewall. This may be done by connecting the PLC to a gateway arranged in the local area network. The gateway connects to a server on the Internet from within the local area network thereby establishing a tunnel through the firewall. Likewise, a client that resides on another local area network, establishes a connection through a possible other firewall to the server, wherein a connection is established from the client to the gateway via the Internet. In order to increase the security an encrypted channel may be established between the gateway and client such that they communicate via a structure similar to a virtual private network (VPN).

EP 1 682 952 discloses a method for maintaining field devices used for process automation technology by means of a maintenance computer (client) which is delivered by a device manufacturer, arranged in a company network of the field device manufacturer and is connected to at least one of the field devices by means of the company network, a public network and a customer network. The public network is provided with a directory server in which a customer unit (gateway) and the maintenance computer are registered and which, upon the customer request, assigns a session identification number, selects the network address of a relay server connected to the public network and transmits the address to the customer unit and the maintenance computer. The relay server and the session identification number enable to set a point-to-point connection for data exchange about the field devices between the customer unit and the maintenance computer in such a way that the pair-to-pair connection makes it possible to communicate by means of a firewall computer which protects the customer network and the company network with respect to the public network.

One problem in the prior art is that while the VPN-like structure disclosed above enables direct communication between the client and the gateway, such a structure provides little flexibility in respect of alternative configurations in case of e.g. a deteriorating communication link. Additionally, such a setup provides few options in respect of controlling the level of security in the system, i.e. a coordinated management of the security at the gateway, the client, and the server becomes cumbersome.

SUMMARY OF THE INVENTION

According to a first aspect, the present invention is realized by a method in a communication system, said system comprising a gateway and a server, said method comprising sending a request for establishment of a communication tunnel from the gateway to the server;

transmitting a secret from the server to the gateway in response to receiving the request in the server;

establishing a communication tunnel by connecting a tunnel client in the gateway to a tunnel server in the server using the received secret;

receiving data from a device connected to the gateway and transmitting at least a portion of the data to the tunnel server via the communication tunnel.

An advantage is that only a trusted gateway may send data to the server. Additionally, the gateway may select the amount of data to transmit to the server.

The method may further comprise storing at least a portion of the received data in the gateway for subsequent transmission to the tunnel server.

The received data may be encrypted in the gateway prior to transmission to the tunnel server.

The request may comprise information related to the location of the gateway.

The method may further comprise transmitting the secret from the server on a condition that the location of the gateway corresponds to location data stored at the server.

The method may further comprise receiving a signal at an input on the gateway and disabling communication via the tunnel on a condition that the signal corresponds to a predetermined signature.

The method may further comprise providing a signal at an output on the gateway, said signal indicating if communication is established between the gateway and the server.

The method may further comprise categorizing the data received from the device in the gateway in at least a first and a second category based on the content of the received data and transmitting only the first category of data to the server.

According to a second aspect of the invention, the present invention is realized by a communication system comprising:

a gateway arranged to send a request for establishment of a communication tunnel to a server;

said server arranged to transmit a secret to the gateway in response to receiving the request in the server;

wherein said gateway comprises a tunnel client arranged to establish a communication tunnel to a tunnel server in the server using the received secret; and said gateway is arranged to receive data from a device connected to the gateway and transmit at least a portion of the data to the tunnel server via the communication tunnel.

The gateway may comprise a memory arranged to store at least a portion of the received data for subsequent transmission to the tunnel server.

The gateway may be arranged to encrypt the received data prior to transmission to the tunnel server.

The gateway may be arranged to include information related to the location of the gateway in the request.

The server may be arranged transmit the secret on a condition that the location of the gateway corresponds to location data stored at the server.

The gateway may comprise an input and is arranged to receive a signal at the input and disable communication via the tunnel on a condition that the signal corresponds to a predetermined signature.

The gateway may comprise an output and is arranged to provide a signal at the output indicating if communication is established between the gateway and the server.

The gateway may be arranged to categorize the data received from the device in at least a first and a second category based on the content of the received data and transmit only the first category of data to the server.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
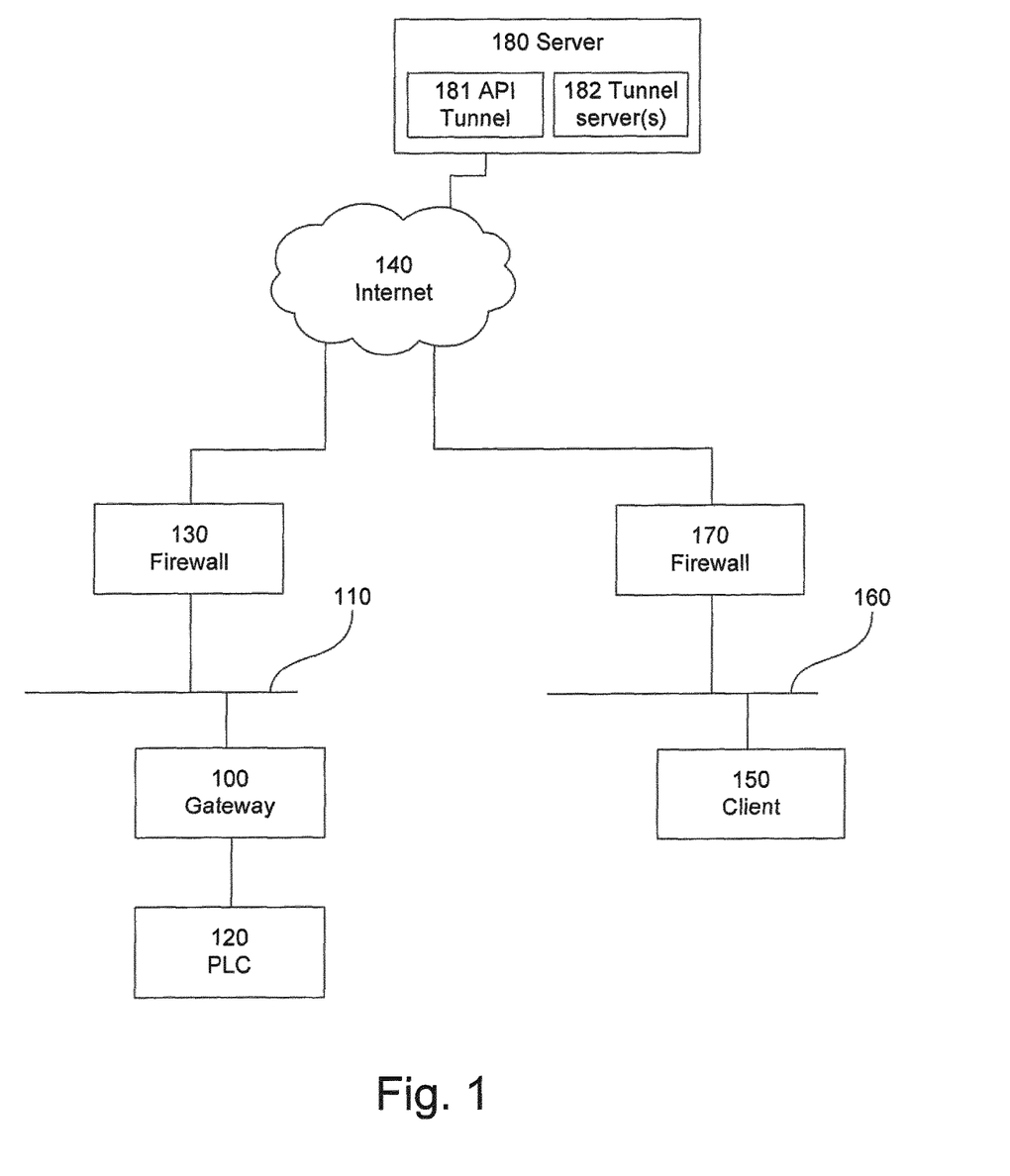
FIG. 1 is a schematic block diagram of a communication system in which the present invention may deployed.

FIG. 1 illustrates a communication system in which the present invention may deployed.

A gateway 100 is arranged in a first local area network 110 e.g. at an industrial plant. The gateway 100 communicates with a PLC 120 for controlling an electrical device, such as a motor, switch, valve etc, and/or collecting data from e.g. a sensor as disclosed above. A first firewall 130 protects the first local area network at the plant from outside attacks and connects the first local area network 110 to a wide area network 140, such as the Internet.

In similarity to the above, a client 150 is arranged in a second local area network 160 which is connected to the Internet 140 via a second firewall 170.

A server 180 is also connected to the Internet 140 and communicates with the gateway 100, via the first firewall 130, and with the client 150, via the second firewall 170, As will be disclosed in more detail below, the server 180 comprises two functional blocks: an API tunnel 181 and one or more tunnel servers 182. The API Tunnel 181 is responsible for creating a communication tunnel from the gateway 110 to the client 150 using the one or more tunnel servers 182.

Figure 2:
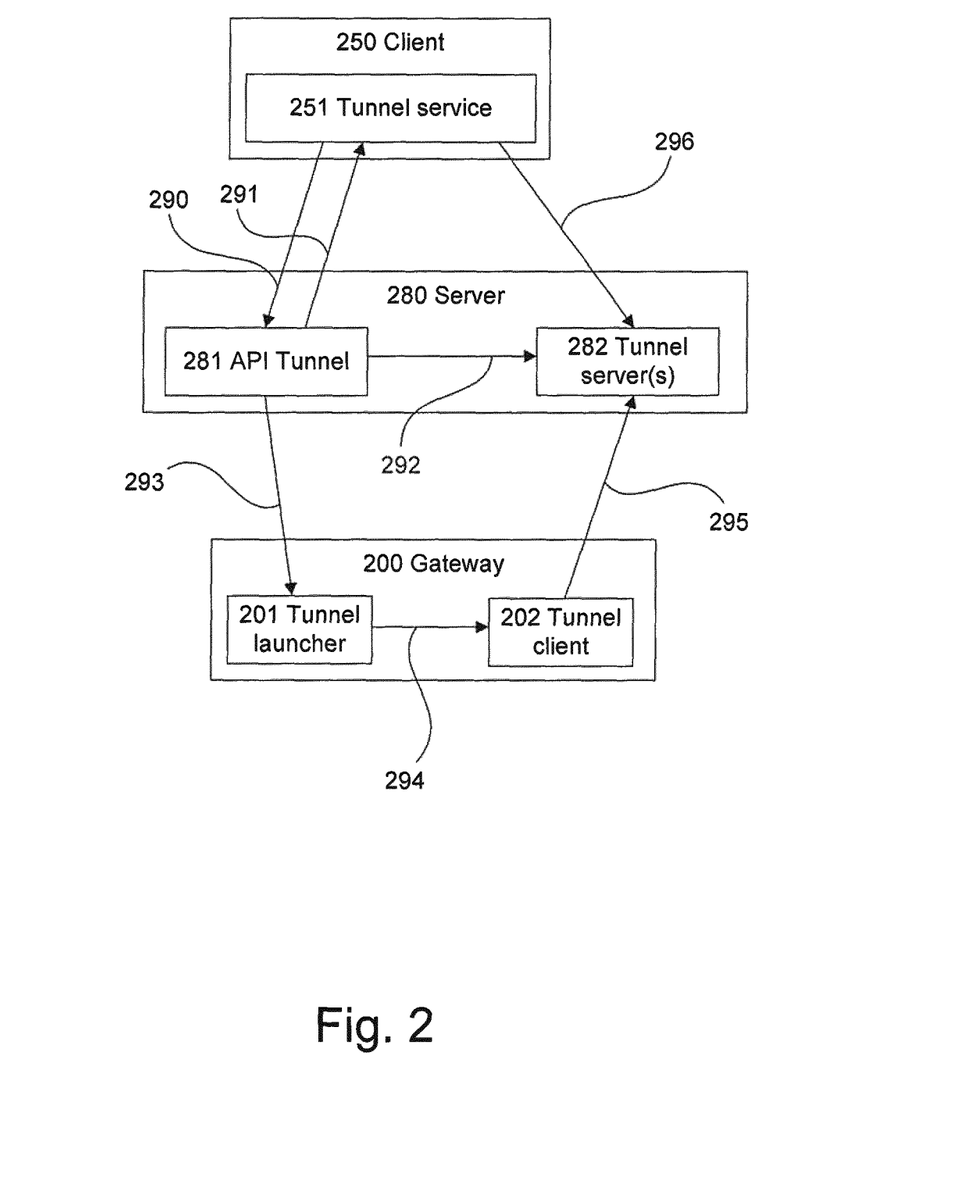
FIG. 2 is a schematic block diagram of a communication tunnel arrangement between a client and a gateway.

FIG. 2 is a schematic block diagram of a communication tunnel arrangement between the gateway 100 and the client 150 shown in FIG. 1. The client 250 comprises a functional block, tunnel service 251, which is arranged to connect to the API tunnel 281 in the server 280. In a preferred embodiment the tunnel service 251 uses web socket over HTTPS to connect to the tunnel server 282. More specifically, the tunnel service 251 sends a request 290 for establishment of a tunnel to the API tunnel 281 by means of a messaging protocol such as extensible messaging and presence protocol (XMPP). The client 250 may use transmission control protocol (TCP) as transport protocol for XMPP, but in a preferred embodiment an HTTP (port 80) or HTTPS (port 443) transport is used for facilitating communication from behind the firewall 130. The request comprises authorization and auditing data needed for determining if the client 250 has the right to connect to the server 280 and gateway 200. In response to the request, the API tunnel returns 291 a one-time secret the client 250 may use when connecting to the tunnel server 282.

After receiving the request 290 from the client 250, the API tunnel 281 instructs 292 the tunnel server 282 to prepare a tunnel and await subsequent tunnel connect requests from the client 250 and the gateway 200. The instruction 292 to prepare a tunnel includes the authorization and auditing data mentioned above necessary for establishing a tunnel between the client 250 and the gateway 200.

The API tunnel 251 also instructs 293 a tunnel launcher 201 in the gateway 200 to initiate 294 a tunnel client 202 in the gateway 200 to connect to the tunnel server 282. The instruction 293 to the tunnel launcher 201 also comprises a one-time secret the tunnel client 202 may use when connecting to the tunnel server 282.

After this setup both the client 250 and the gateway 200 are ready to connect 295, 296 to the tunnel server 282 using the one-time secrets. The connection 295, 296 to the tunnel server 282 is preferably done using web socket. By utilizing an HTTP-compatible handshake it is possible to tunnel through the firewalls 130 and 170 via the default HTTP and HTTPS ports (80 and 443). It is emphasized in this context that the initiation of the tunnel as disclosed above may be done by the gateway 200, wherein the request for establishment of a tunnel to the API tunnel is sent from the gateway 200.

Figure 3:
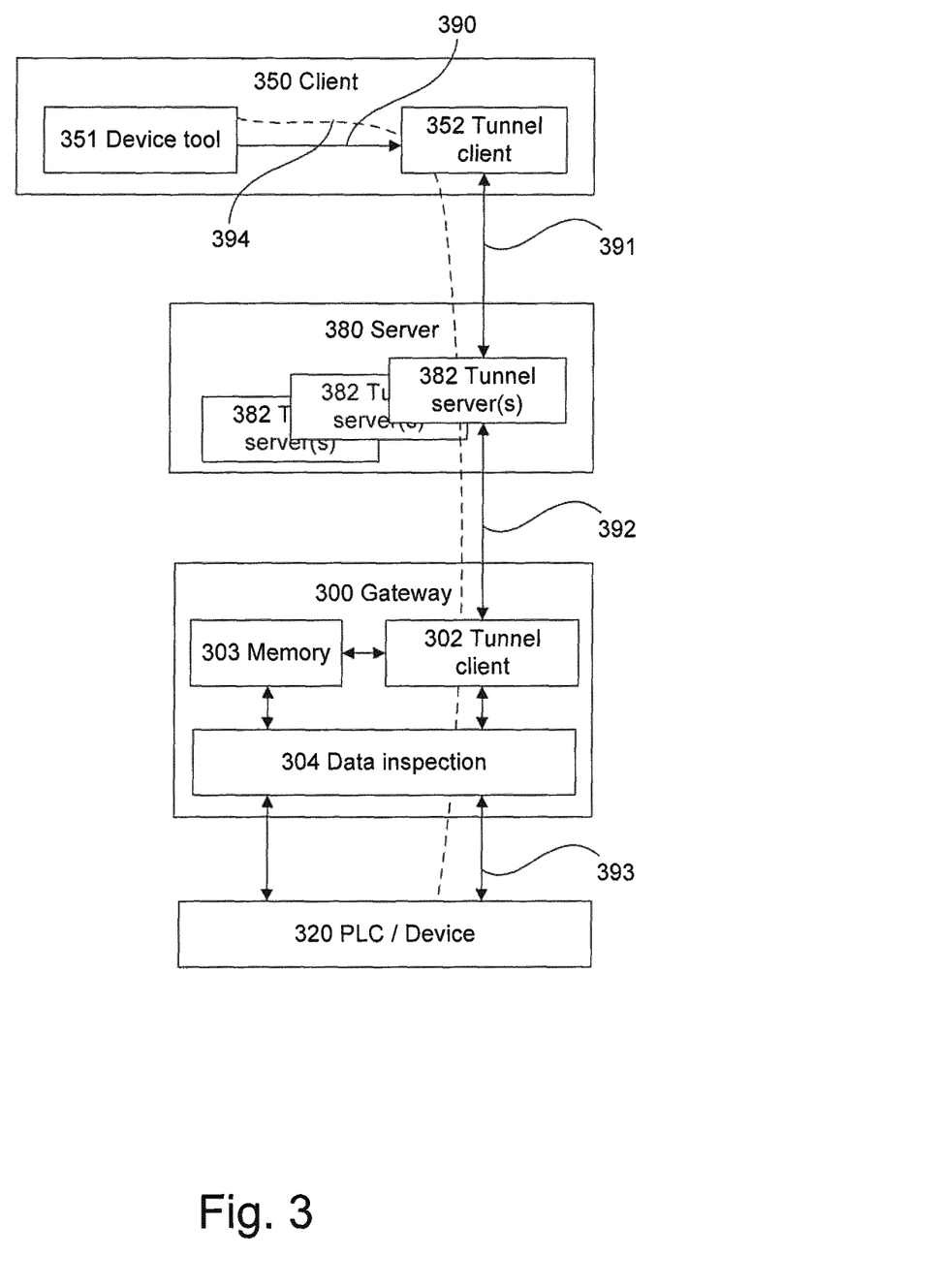
FIG. 3 is a schematic block diagram of a communication channel established in the tunnel shown in FIG. 2.

With reference to FIG. 3 the establishment of a communication channel between a device tool 351 in the client 350 and a PLC/device 320 will be disclosed. The device tool 351 may comprise PLC programming tools tin order to remotely program the PLC 320.

The device tool 351 is configured to connect 390 to a virtual connector created in the tunnel client 352. The virtual connector forwards 391 the connection from the tunnel client 352 to the tunnel server 382 using the web socket disclosed above.

The tunnel server 382 performs authorization of the tunnel client 352 and if allowed forwards 392 the connection to the tunnel client 302 in the gateway 300.

The tunnel client 302 in the gateway 300 performs the connection 393 to the PLC 320, wherein the device tool 351 gains access to the PLC 320.

In order to protect the communication in the channel 394 (indicated by the dashed line in FIG. 3) between the tunnel client 352 in the client and the tunnel client 302 in the gateway 302 from eavesdropping, the channel may be encrypted. That is, by use of the one or more tunnel servers 382 in the server 380, a VPN is established between the device tool 351 and the remote PLC/device 320. By this so-called remote access the VPN provides a transparent connection as if the device tool 351 in client 350 was connected directly to the PLC 320. This enables the use of e.g. PLC programming tools to remotely program the PLC.

Additionally, the client 350 may need to connect to the PLC 320 for other reasons. In one scenario remote logging of data from devices connected to the PLC 320 may be desired. By this so-called remote management logging of data is done locally in a memory 303 at the gateway 300 and data is transmitted to the client 350 or a central server (not shown) periodically. This arrangement is beneficial in that no data are lost in case of loss of connection 394 between the gateway 300 and the client 350 (or server). The gateway 300 may also analyze the logged data and determine if the content of the data calls for specific actions. That is, the logged data can e.g. give an indication that the device connected to the PLC is not working properly, that a temperature measured by the device is too high etc., wherein the gateway may send a message to the server providing information about the anomaly.

In order to take advantage of both remote access and remote management, the gateway 300 may comprise a data inspection block 304 (either in form of dedicated hardware, such as a processor, FPGA, ASIC or the like, or in the form of software code portions that perform the inspection functionality when executed in a processor) which inspect the traffic in the gateway 300 in order to determine which traffic should be handled locally at the gateway 300 and which traffic should be sent through the VPN. To this end, the gateway 300 may inspect the traffic and handle industrial protocols (such as ModbusTCP, EthernetIP etc.) locally, thereby enabling local logging of data in the gateway 300. Alternatively, or additionally, this switch or combination between remote management and remote access may be performed by sending a message to the gateway 300 from the client 350 via the server 380 indicating in which mode the gateway 300 shall operate.

Figure 4:
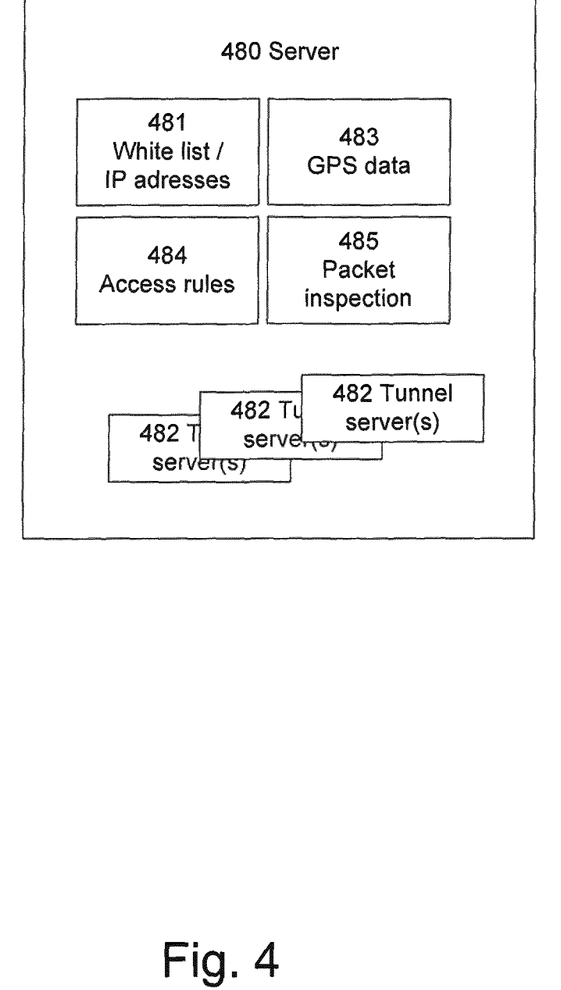
FIG. 4 is a schematic block diagram of a security arrangement for use with the tunnel of FIG. 2.

FIG. 4 is a schematic block diagram of a security arrangement for use with the tunnel of FIG. 2.

The server 480 comprises a white list of gateway 100 or client 150 IP addresses 481 which are considered valid in the sense that calls or requests for establishing a tunnel from a gateway 100 or client 150 on the list as disclosed in relation to FIG. 2 will be granted. More specifically, the white list 481 comprises a list of specific IP addresses and/or IP address ranges associated with the locations of the gateways 100 and clients 150 in the system, such that the server 480 may determine from what location the request is made. That is, when the server 480 receives a request for preparing a tunnel, the server 480 correlate the IP address of the calling gateway 100 or client 150 with the white list 481 and determines if the request shall be granted. The white list 481 may, as an alternative to or in addition to the IP addresses, also comprise a list of valid MAC addresses in order to identify the calling gateway 100 or client 150, should the gateway 100 or client 150 e.g. be behind a proxy and using its IP address.

To even further safeguard that only authorized gateways 100 and clients 150 are allowed to make requests for establishing tunnels, e.g. in a situation where a fraudulent party tries to gain access to the system by imitating a different IP or MAC address, the server 480 may comprise GPS data 483 associated with the gateways 100 and/or clients 150 that are connected to the server 480. It may be that not all gateways 100 and clients 150 in the system may be able to report their GPS data (e.g. due to the fact that they are installed inside an industrial plant where GPS reception is poor or absent). If so, the white list 481 in the server 480 preferably comprises indications for which gateways 100 and clients 150 no valid GPS data are available, such that extra security measures may be initiated should any suspicion about an outside attack be present. In this embodiment the gateways 100, clients 150 or both are arranged with a GPS receiver in order to determine its own position.

By this arrangement, any fraudulent person who tries to get access to the system by imitating the IP and/or MAC address of e.g. a gateway 100 needs to know the exact location of the gateway 100. Further, on installation of the gateway 100, its position may be stored in a memory protected by encryption with a password only known by the server. When a subsequent authentication of the gateway 100 needs to be performed, the encrypted GPS data may be transferred together with the actual GPS position and compared in the server 480. Access to the system will be denied should the GPS data on the white list 381, the encrypted GPS data and the actual GPS data differ. By this provision, no fraudulent person will be able to remove a gateway 100 from its installation location and try to connect to the server from another, unpermitted location.

When a person wants to log into the server 180 via the client 100 shown in FIG. 1, it is possible to even further increase the security by providing a one-time password to the user via a messaging service (not shown) such as SMS once the authentication of the user has turned out positive (i.e. the user name and password provided to the server 180 from the client 150 are valid). The user at the client 150 then, in addition to the user name and password disclosed above, provides the one-time password to the server via the local area network 160. The one-time password received in the server is then compared to the one-time password transmitted via the messaging service. Access to the server will then only be granted if the two passwords match. This prevents unauthorized access to the system should a fraudulent person gain access to the user name and password since the one-time password will only be received e.g. in the mobile phone of the registered user.

As an alternative to or in addition to the location-based access rules described above, other types of access rules 484 may be configured in the server 480. Access rules 484 may be configured to apply to all IP traffic, to a specific set of protocol definitions, or to all IP traffic except selected protocols, e.g. allowing public access from the Internet to a web interface in the server 480. In case the communication in the channel 394 is encrypted as disclosed above, the access rules are preferably handled in the gateway 300 and the client 350.

The server 480 may also comprise a functional block 485 arranged to make packet inspection of the IP traffic in the server 480. The packet inspection block 485 analyses the data passing through the server in order to e.g. determine what protocols are used for communication, the origin and destination of the data etc. By this measure the party responsible for the operation of the server 480 may detect any outside attacks originating from gateways 100 or clients 150 connected to the system, e.g. by identifying attempts to get unauthorized access from a gateway 100 to a client 150.

In case an encrypted channel has been established between the gateway 300 and the client 350 as disclosed in relation to FIG. 3, if packet inspection is to be used at the server 380, the packet inspection block 485 needs to have access to the password used for encrypting the channel. This may be provided from either the gateway 300 or the client 350 when the channel 394 is established, or upon request from the server 480. Alternatively the packet inspection block may be implemented in the gateway 300 or the client 350, thereby enabling packet inspection without giving the server 380 access to the encrypted channel 394.

Alternatively, if the channel 394 between the gateway 300 and the client 350 constitutes a locked VPN (without the possibility to decrypt the channel 394 on the fly in the server 380), the server 380 may request the gateway 300 and client 350 to open up the VPN for inspection at some instances in order to determine which protocols that are used etc.

With reference back to FIG. 1, FIG. 3 and the discussion above it becomes clear that different parties in the communication system may want to have influence on the security in the system. More specifically, the owner of the industrial plant/site where the gateway 100 and PLC 120 are situated does not want the user of the client (e.g. the manufacturer of the PLC) or the operator of the server to be in control of the security at the site. The firewall 130 in FIG. 1 which protects the local area network at the site where the gateway 100 and PLC 120 are located will be operated in accordance with a set of parameters, such as which ports to keep open etc. Further the selection of which encryption to use for the channel 394 between the gateway 300 and the client 350 also calls for the need to set up a number of parameters.

Since the security settings in the gateway 300 require extensive knowledge of the all security parameters needed, in an embodiment of the present invention different parameters are grouped together such that a technician, who has the task to configure the security at the gateway 300 may be presented with a limited number of security options shown on a screen connected to the gateway 300. These options may be in the form of a selectable list, such as "low security", "medium security" and "high security", or in the form of a graphical slider shown on the screen. The option "high security" may in this embodiment correspond to strong encryption of the channel, strong encryption of GPS data in the gateway 300, demand for digital certificates from the server 380 and the client 350 etc. By grouping different parameters together in this way, a reconfiguration of the security level at the gateway 300 will be easy to perform.

Figure 5:
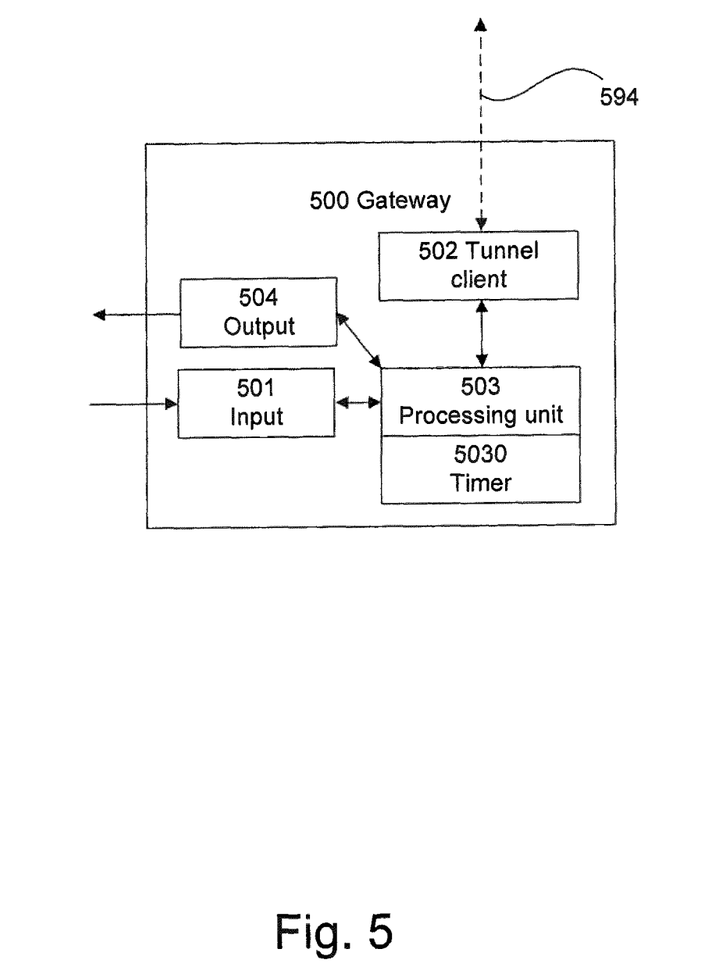
FIG. 5 illustrates an input/output arrangement which may be used at a gateway 500.

FIG. 5 illustrates an input/output arrangement which may be used at a gateway 500. The gateway 500 may be provided with an input 501 which is monitored by a processing unit 503 in the gateway 500. More specifically, the processing unit is arranged to monitor the input 501, which preferably is digital, and determine if a signal is present on the input 501 indicating whether remote access to the gateway 500 shall be allowed or not, i.e. a signal present on the input 501 will control whether or not access to the gateway 500 via the channel 594 shall be allowed.

The signal received at the input 501 may at its simplest be in the form of a digital high/low signal provided by a three-pole switch connected to the voltage feed and ground. A technician at the site where the gateway 500 is located may thus with simple means block all remote access to the gateway 500 e.g. during a planned maintenance session. Correspondingly, an authorized technician at the site may enable remote access to the gateway 500 after start-up of the gateway 500.

The signal may also be of a more complex structure, e.g. constituting a digital certificate stored on a USB stick or the like which is connected to the processing unit 503 via the input 501. This will provide the possibility to restrict which persons who are allowed to block or allow the remote access.

The processing unit 503 may comprise a timer 5030 which reacts to the reception of a valid signal on the input 501. When the processing unit 503 receives a valid signal at the input 501 as disclosed above, it starts the timer 5030 in order to enable or disable remote access for a predetermined time. Different users at the gateway 500, who may be identified by means of the signal provided on the input as disclosed above, may be authorized to enable/disable the remote access for different lengths of time.

The gateway 500 may be provided with an output 504 which is connected to the processing unit 503. The processing unit 503 is arranged to send a signal to the output 504 indicative of the status of the remote access to the gateway 500. That is, the output 504 may be read by other devices connected to the gateway 500 thereby providing them with information whether or not remote access is active. The output may also or additionally be connected to an indicator, such as a LED or lamp in order to give an indication to persons located in the vicinity of the gateway 500 that remote access is enabled or disabled.

In an embodiment may the white list 481 disclosed in relation to FIG. 4 be distributed from the server 480 to the gateway 100 and the client 150 and also comprise user data such that only authorized users may gain access to the gateway 100 and client 150. The operator of the server 380 may then dynamically control which users that may get access to the system.

Reference back to FIGS. 3, 4 and 5, there may be situations where all or parts of the tunnel from the gateway 300 via the server 380 to the client 350 has to be established over a mobile link. This may be in a situation where the gateway 300 is connected to a device 320 arranged e.g. in a mobile base station in a rural district.

In one embodiment the processing unit 503 shown in FIG. 5 is arranged to use the timer 5030 to restrict the up-time for the mobile link/channel 594 created from the gateway 500 to the server 380 (and further to the client 350). By restricting the time the mobile link is active, the communication costs may be kept within predetermined limits.

In another embodiment the processing unit 503 may restrict the amount of data that is sent to/from the gateway 500. This may be useful when the gateway is connected to a network without a so-called flat rate pricing scheme.

In the above embodiments it is advantageous to use packet inspection 485 in order to determine what data is transmitted to/from the gateway 500. By this arrangement it is possible to allow critical data, such as firmware upgrades, alarms etc., to be received/transmitted while blocking low priority data such as reporting of non-critical process data. To this end the gateway 300, server 380 and client 350 are provided with a list of data types including their priority for transmission. If an encrypted channel as disclosed above is used for transmissions from the gateway 300 the packet inspection has to be performed in the gateway 300. This can be accomplished by implementing a packet inspection block in the gateway 300 (not shown), which is analogous in function to the packet inspection block 485 implemented in the server 380.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method in a communication system, said system comprising a gateway and a server, said method comprising:
   sending a request for establishment of a communication tunnel between the server and the gateway;
   transmitting a secret from the server to the gateway;
   establishing a communication tunnel by connecting a tunnel client in the gateway to a tunnel server in the server using the received secret;
   receiving, at a first input on the gateway, data from a device connected to the gateway;
   categorizing, at the gateway, the data received from the device in to at least a first and a second category based on the content of the received data;
   transmitting at least a portion of the data to the tunnel server via the communication tunnel, wherein the portion of the data transmitted to the tunnel server comprises the first category of data, and the second category of data is not transmitted to the tunnel server;
   receiving a signal at a second input on the gateway; and
   disabling communication via the communication tunnel on a condition that the signal on the second input corresponds to a predetermined signature.

2. The method according to claim 1, further comprising storing at least a portion of the received data in the gateway for subsequent transmission to the tunnel server.

3. The method according to claim 1, wherein the received data is encrypted in the gateway prior to transmission to the tunnel server.

4. The method according to claim 1, further comprising sending second data from the gateway to server, the second data comprising information related to the location of the gateway.

5. The method according to claim 4, further comprising transmitting the secret from the server on a condition that the location of the gateway corresponds to location data stored at the server.

6. The method according to claim 1, further comprising providing a signal at an output on the gateway, said signal indicating if communication is established between the gateway and the server.

7. A communication system comprising:
   a server configured to send a request for establishment of a communication tunnel between the server and a gateway;
   said server further configured to transmit a secret to the gateway, wherein said gateway comprises a tunnel client configured to establish a communication tunnel to a tunnel server in the server using the received secret; and
   said gateway is further configured to:
      receive, at a first input on the gateway, data from a device connected to the gateway,
      categorize the data received from the device in to at least a first and a second category based on the content of the received data,
      transmit at least a portion of the data to the tunnel server via the communication tunnel, wherein the portion of the data transmitted to the tunnel server comprises the first category of data, and the second category of data is not transmitted to the tunnel server,
      receive a signal at a second input on the gateway; and
      disable communication via the communication tunnel on a condition that the signal on the second input corresponds to a predetermined signature.

8. The communication system according to claim 7, wherein the gateway comprises a memory configured to store at least a portion of the received data for subsequent transmission to the tunnel server.

9. The communication system according to claim 7, wherein the gateway is configured to encrypt the received data prior to transmission to the tunnel server.

10. The communication system according to claim 7, wherein the gateway is configured to transmit second data related to the location of the gateway to the server.

11. The communication system according to claim 10, wherein the server is configured transmit the secret on a condition that the location of the gateway corresponds to location data stored at the server.

12. The communication system according to claim 7, wherein the gateway comprises an output, and the gateway is configured to provide a signal at the output indicating if communication is established between the gateway and the server.

13. A gateway device comprising a processor and memory, the processor configured to:
   receive a request for establishment of a communication tunnel between a server and the gateway;
   receive a secret to from the server;
   establish a communication tunnel with a tunnel server in the server using the received secret;
   receive, at a first input, data from a device connected to the gateway;
   categorize the data received from the device in to at least a first and a second category based on the content of the received data;
   transmit at least a portion of the data to the tunnel server via the communication tunnel, wherein the portion of the data transmitted to the tunnel server comprises the first category of data, and the second category of data is not transmitted to the tunnel server;
   receive a signal at a second input on the gateway; and
   disable communication via the communication tunnel on a condition that the signal on the second input corresponds to a predetermined signature.

14. The gateway device according to claim 13, wherein memory is configured to store at least a portion of the received data for subsequent transmission to the tunnel server.

15. The gateway device according to claim 13, wherein the processor is configured to transmit second data related to the location of the gateway to the server.

* * * * *